(12) United States Patent
Tanimura et al.

(10) Patent No.: US 7,385,775 B2
(45) Date of Patent: Jun. 10, 2008

(54) INFORMATION REPRODUCING APPARATUS AND INFORMATION RECORDING/REPRODUCING APPARATUS

(75) Inventors: Kazunari Tanimura, Kanagawa (JP); Hiroshi Kiriyama, Kanagawa (JP); Toru Amano, Kanagawa (JP); Hiroaki Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 11/291,620

(22) Filed: Dec. 1, 2005

(65) Prior Publication Data

US 2006/0158766 A1 Jul. 20, 2006

(30) Foreign Application Priority Data

Dec. 3, 2004 (JP) ............................. 2004-351561

(51) Int. Cl.
*G11B 19/02* (2006.01)
(52) U.S. Cl. ...................................................... 360/69
(58) Field of Classification Search .................. 360/69, 360/60, 77.12
See application file for complete search history.

(56) References Cited

U.S. PATENT DOCUMENTS

| | | | | |
|---|---|---|---|---|
| 5,754,648 A * | 5/1998 | Ryan et al. | .................. | 380/201 |
| 5,754,649 A * | 5/1998 | Ryan et al. | .................. | 380/203 |
| 6,891,953 B1 * | 5/2005 | DeMello et al. | ............ | 380/277 |
| 6,980,387 B2 * | 12/2005 | Yoshizawa et al. | ........... | 360/69 |
| 6,999,587 B1 * | 2/2006 | Asano et al. | ................ | 380/202 |
| 7,016,498 B2 * | 3/2006 | Peinado et al. | ............. | 380/277 |
| 7,021,537 B2 * | 4/2006 | Tropp | .......................... | 235/384 |
| 7,047,411 B1 * | 5/2006 | DeMello et al. | ............ | 713/176 |
| 7,051,005 B1 * | 5/2006 | Peinado et al. | ................ | 705/57 |
| 7,072,865 B2 * | 7/2006 | Akiyama | ....................... | 705/51 |
| 7,103,574 B1 * | 9/2006 | Peinado et al. | ................ | 705/51 |
| 7,134,144 B2 * | 11/2006 | McKune | ....................... | 726/26 |
| 7,136,838 B1 * | 11/2006 | Peinado et al. | ................ | 705/59 |
| 7,158,953 B1 * | 1/2007 | DeMello et al. | ............... | 705/51 |
| 2003/0065957 A1 * | 4/2003 | Tsuji et al. | .................. | 713/202 |
| 2003/0195855 A1 * | 10/2003 | Parks et al. | .................... | 705/51 |
| 2005/0125357 A1 * | 6/2005 | Saadat et al. | .................. | 705/57 |
| 2006/0051056 A1 * | 3/2006 | Furukawa et al. | ............ | 386/69 |

FOREIGN PATENT DOCUMENTS

| | | |
|---|---|---|
| JP | 58 46452 | 3/1983 |
| JP | 62 188055 | 8/1987 |
| JP | 6 259939 | 9/1994 |
| JP | 7 287655 | 10/1995 |
| JP | 2001 110135 | 4/2001 |
| JP | 2001 352322 | 12/2001 |
| JP | 2002 279727 | 9/2002 |
| JP | 2002 319229 | 10/2002 |
| JP | 2003 132623 | 5/2003 |
| JP | 2003 177970 | 6/2003 |
| JP | 2003 249012 | 9/2003 |

* cited by examiner

*Primary Examiner*—Fred F. Tzeng
(74) *Attorney, Agent, or Firm*—Frommer Lawrence & Haug LLP; William S Frommer (57) ABSTRACT

An information reproduction system that provides an apparatus for reproducing audio/video information from an information recording medium having a tape form for example and circumventing problems associated with illegal copies of information recording media. If a match is found between the contents of identification data information read from a memory fixed to a cassette incorporating a magnetic tape and the contents of individual key data information stored in an information storage memory, a controller causes an information reproducing block to reproduce main information from the magnetic tape.

18 Claims, 7 Drawing Sheets

INFORMATION REPRODUCING APPARATUS AND INFORMATION RECORDING/REPRODUCING APPARATUS

CROSS REFERENCES TO RELATED APPLICATIONS

The present invention contains subject matter related to Japanese Patent Application JP 2004-351561 filed in the Japanese Patent Office on Dec. 3, 2004, the entire contents of which being incorporated herein by reference.

BACKGROUND OF THE INVENTION

The present invention relates to an information reproducing apparatus for reproducing video and audio information recorded to information recording media having a tape or disc form and an information recording/reproducing apparatus for recording various kinds of information to information recording media having a tape or disc form and reproducing various kinds of information recorded to information recording media having a tape or disc form.

In the production fields of movies, music information, and broadcast programs, various kinds of digital information processing technologies such as computer graphics, data compression and decompression, and data synthesis for example have come to full utilization. And finished products are stored by recording them to information recording media such as magnetic tapes and magneto-optical discs. Today, huge amounts of information recording media (hereafter referred to digital information recording media) in which various kinds of information such as movies, music, broadcast programs are stored as digital content are available on the market.

These digital information recording media are advantageous in that, once originals have been produced, the originals may be copied with ease and comparably low cost and the copies may be copied again with ease, both originals and copies capable of being reproduced with comparatively high quality with many information reproducing apparatuses or information recording/reproducing apparatuses having similar functions. These advantages over analog counterparts one of the major reasons for the wide spreading of various kinds of digital information recording media.

SUMMARY OF THE INVENTION

However, the above-mentioned advantages may easily turn to disadvantages that the authorized producers and licensees of products are seriously damaged if unauthorized copies are marketed immediately after the completion of originals of movies or music for example and authorized copies thereof and before the marketing of these authorized products, for example. These disadvantages are caused from the very advantages of digital information recording media.

To be more specific, it is supposed that a completed original product be stolen, the stolen product be copied with an information recording/reproducing apparatus to other information recording media, and then the stolen product be returned to its original owner without his noticing it. The thief markets the illegal copies on a massive scale before the legal copies are marketed. The illegal copies may be reproduced in the same manner as the legal copies by use of ordinary information reproducing apparatuses or information recording/reproducing apparatuses.

These illegal acts are often hard to uncover because stolen originals are returned to their lawful owner covertly in a short time. Even if uncovered, it would often too late to recover the damages inflicted by the theft. Thus, the very advantages of digital information recording media may present serious problems to the lawful producers and licensees of originals.

In order to circumvent the above-mentioned problems associated with illegal copies of digital information recording media and associated with various kinds of information recording media, the construction of an information reproducing system may be proposed in which the reproduction of the information from various kinds of information recording media that are digital information recording media produced as originals or equivalents thereto may be executed properly only with predetermined particular information reproducing apparatuses or information recording/reproducing apparatuses, rather than with unspecified information reproducing apparatuses or information recording/reproducing apparatuses. Such a system makes it difficult to get illegal copies by executing information reproduction from digital information recording media produced as original products or digital information recording media produced as equivalents of the originals and recording the reproduced information to other information recording media by use of unspecified information reproducing apparatuses or information recording/reproducing apparatuses, for example.

However, with related-art technologies, there is neither any information reproducing apparatuses or information recording/reproducing apparatuses that may solve the above-mentioned problems associated with illegal copies of digital information recording media nor any documents describing such information reproducing apparatuses or information recording/reproducing apparatuses as far as the knowledge of the applicant hereof is reaches.

The present invention addresses the above-identified and other problems associated with related-art apparatuses and method and therefore provides a novel information reproducing apparatus for reproducing video and audio information from tape- and disc-formed information recording medium and a novel information recording/reproducing apparatus for recording various kinds of information to tape- and disc-shaped information recording media and reproducing various kinds of information from tape- and disc-formed information recording media, the information reproducing apparatus and the information recording/reproducing apparatus capable to constructing an information reproducing system that solves the above-mentioned problems.

In carrying out the invention and according to one embodiment thereof, there is provided an information reproducing apparatus having: information reproduction means for reproducing information from a recording area of an information recording medium; data information read means for reading data information from an information recording medium or memory fixed to a case incorporating the information recording medium; information storage memory means for storing unique individual key data information; and operation control means for selectively setting an information reproduction restriction status for imposing a restriction on reproduction of main information read from a recording area of an information by the information reproduction means. With the information recording medium for information reproduction loaded and the information reproduction restriction status set, the operation control means compares contents of identification key data information read from any one of the loaded information recording medium and the memory fixed to the case incorporating the information recording medium with contents of the individual key data information stored in the information storage memory and, if a match is found, reproduces the main information read from the recording area of the loaded information recording medium.

Especially, in the above-mentioned information reproducing apparatus, the information storage memory also stores master key data information in addition to the unique individual key data information. When contents of master key data information reproduced from the recording area of the loaded information recording medium match with contents of master key data stored in the information storage memory, if, in any one of the following two cases, the information reproduction means reproduces main information from the recording area of the loaded information recording medium. One case is that, with the information recording medium loaded and the information reproduction restriction status set, the operation control means is incapable of getting data information read from any one of the information recording medium and the memory fixed to the case incorporating the information recording medium by the data information read means. The other case is that, there is mismatch between contents of unique identification data information read from any one of said loaded information recording medium and said memory means fixed to said case incorporating said information recording medium, and contents of unique identification data information reproduced from said recording area of said loaded information recording medium.

In carrying out the invention and according to another embodiment thereof, there is provided an information recording/reproducing apparatus. The apparatus has: recording/reproducing means for recording information to a recording area of an information recording medium and reproducing information from a recording area of an information recording medium; read/write means for reading data information from any one of information recording medium and memory fixed to a case incorporating the information recording medium and writing data information to any one of information recording medium and memory fixed to a case incorporating the information recording medium; information storage memory means for storing unique individual key data information; and operation control means. The operation control means sets: an operation status in which the read/write means reads unique identification data information from any one of information recording medium and memory means fixed to a case incorporating the information recording medium and the recording/reproducing means records the unique identification data information read by the read/write means to a recording area of the information recording medium; an operation status in which the read/write means writes identification key data information having substantially the same contents as contents of individual key data information stored in the information storage memory to any one of an information recording medium and memory fixed to a case incorporating the information recording medium; and an information reproduction restriction status in which a restriction is imposed on reproduction of main information from a recording area of an information recording medium by the recording/reproducing means. The operation control means compares, with an information recording medium for information reproduction loaded and the information reproduction restriction status set, contents of identification key data information read from any one of the loaded information recording medium and the memory means fixed to the case incorporating the information recording medium with contents of individual key data information stored in the information storage memory and, if a match is found, the recording/reproducing means reproduces main information from a recording area of the loaded information recording medium.

Especially, in the above-mentioned information recording/reproducing apparatus, the information storage memory also stores master key data information in addition to the unique individual key data information, and the operation control means also sets an operation status in which the recording/reproducing means records master key data information stored in the information storage memory means to a recording area of an information recording medium. Further, with the information recording medium loaded and the information reproduction restriction status set, if data information is not obtained from any one of the loaded information recording medium and the memory fixed to the case incorporating the information recording medium, or if the mismatch is found between the contents of unique identification data information read from any one of said loaded information recording medium and memory means fixed to a case incorporating the information recording medium obtained from the read/write means and contents of unique identification data information reproduced from the recording area of the loaded information recording medium obtained from the recording/reproducing means, the recording/reproducing means reproduces main information read from the recording area of the loaded information recording medium, when there is a match between contents of master key data information reproduced from the recording area of the loaded information recording medium obtained from the recording/reproducing means and contents of master key data information stored in the information storage memory means.

As described above, the above-mentioned information reproducing apparatus has operation control means for selectively set the information reproduction restriction status in which a restriction is imposed on reproduction of main information read from a recording area of an information recording medium by the information reproducing means. With the information recording medium for information reproduction loaded and the information reproduction restriction status set, the operation control means causes the information reproducing means to reproduce main information from the recording area of the loaded information recording medium if there is a match between contents of identification key data information read from the loaded information recording medium or the memory fixed to the case incorporating this information recording medium and contents of individual key data information stored in the information storage memory. Consequently, the information recording medium loaded on the above-mentioned information reproducing apparatus allows the reproduction of main information from a recording area of the information recording medium by the information reproducing means only when there is a match between the contents of identification key data information stored in the information recording medium or the memory fixed to the case incorporating the information recording medium and the contents of individual key data information stored in the information storage memory.

The above-mentioned information recording/reproducing apparatus has operation control means which sets the following three statuses. One is an operation status in which the read/write means reads unique identification data information from any one of information recording medium and memory fixed to a case incorporating the information recording medium and the recording/reproducing means records the unique identification data information read by the read/write means to a recording area of the information recording medium. Another is an operation status in which the read/write means writes identification key data information having substantially the same contents as contents of individual key data information stored in the information storage memory to any one of an information recording medium and memory means fixed to a case incorporating the information recording medium. Further is an information reproduction restriction status in which a restriction is imposed on reproduction of main information from a recording area of an information recording medium by the recording/reproducing means. The operation control means compares, with an information recording medium for information reproduction loaded and the information reproduction restriction status set, contents of identification key data information read from any one of the loaded information recording medium and the memory fixed to the case incorporating the information recording medium with contents of individual key data information stored in the information storage memory and, if a match is found, the recording/reproducing means reproduces main information from a recording area of the loaded information recording medium. Consequently, the information recording medium loaded on the above-mentioned information recording/reproducing apparatus allows the reproduction of main information from a recording area of the information recording medium by the information recording/reproducing means only when there is a match between the contents of identification key data information stored in the information recording medium or the memory fixed to the case incorporating the information recording medium and the contents of individual key data information stored in the information storage memory.

As described and according to one embodiment of the invention, the information recording medium loaded on the above-mentioned information reproducing apparatus allows the correct reproduction of main information from a recording area of the information recording medium only when a restriction is imposed on the reproduction of the main information read from the recording area and the above-mentioned information reproducing apparatus corresponds to a preset particular information reproducing apparatus. Therefore, the above-mentioned information reproducing apparatus practiced as one embodiment of the invention may constitute an information reproduction system that circumvents the above-mentioned problems associated with the illegal copies of digital information recording media and like problems associated with various kinds of information recording media, thereby providing wide applications in various fields.

As described and according to another embodiment of the invention, the information recording medium loaded on the above-mentioned information recording/reproducing apparatus allows the correct reproduction of main information from a recording area of the information recording medium only when a restriction is imposed on the reproduction of the main information read from the recording area and the above-mentioned information recording/reproducing apparatus corresponds to a preset particular information recording/reproducing apparatus. Therefore, the above-mentioned information recording/reproducing apparatus practiced as another embodiment of the invention may constitute an information reproduction system that circumvents the above-mentioned problems associated with the illegal copies of digital information recording media and like problems associated with various kinds of information recording media, thereby providing wide applications in various fields.

DETAILED DESCRIPTION OF THE PREFERRED EMBODIMENTS

Preferred embodiments of the invention will be described by use of the following three embodiments 1, 2, and 3.

Embodiment 1

Figure 1:
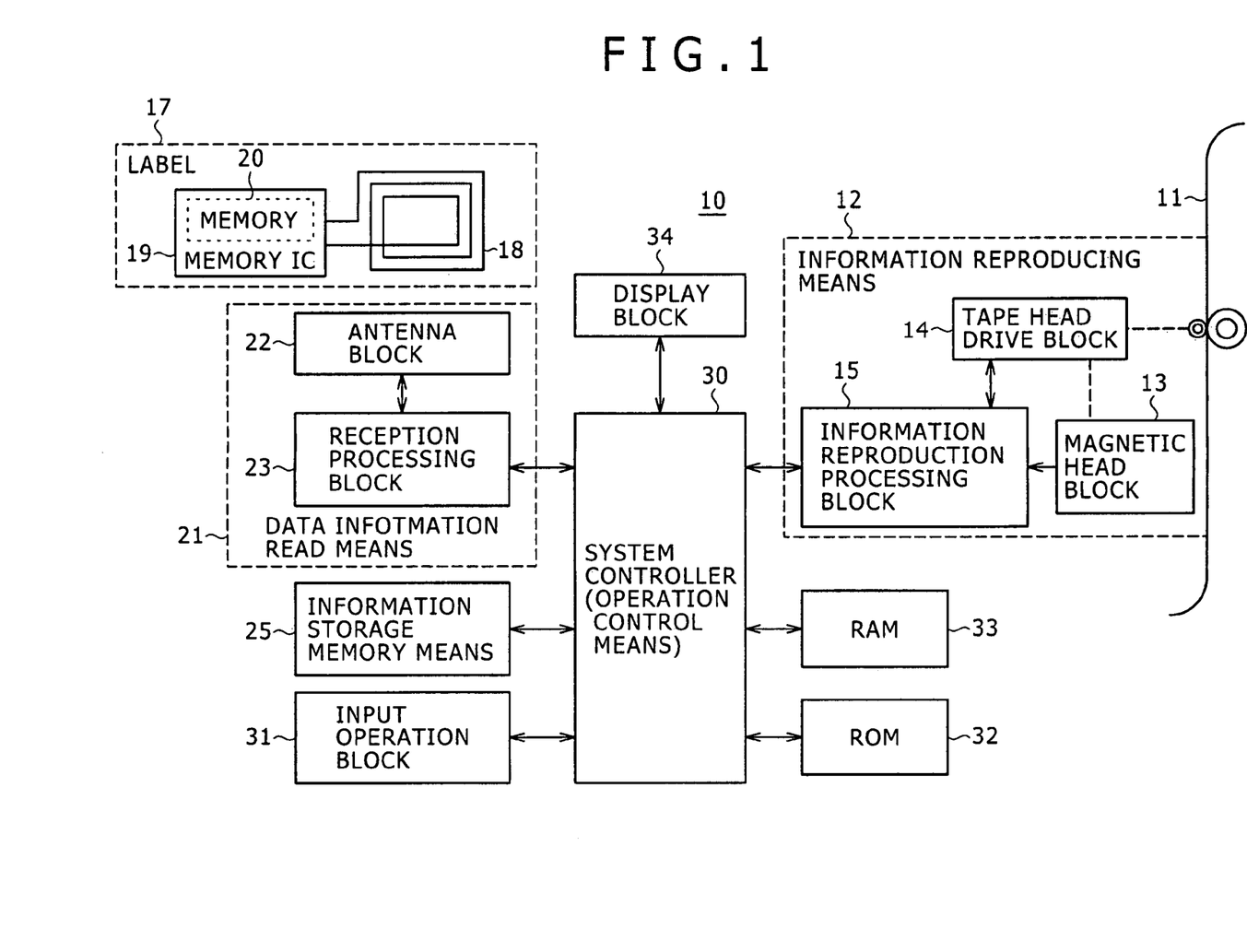
FIG. 1 is a block diagram illustrating an exemplary configuration of an information reproducing apparatus practiced as one embodiment of the invention along with an information recording medium loaded thereon and an exemplary label associated therewith.

Now, referring to FIG. 1, there is shown an exemplary configuration of an information reproducing apparatus practiced as a first embodiment of the invention, along with an information recording medium loaded thereon and an exemplary label associated therewith.

Figure 2:
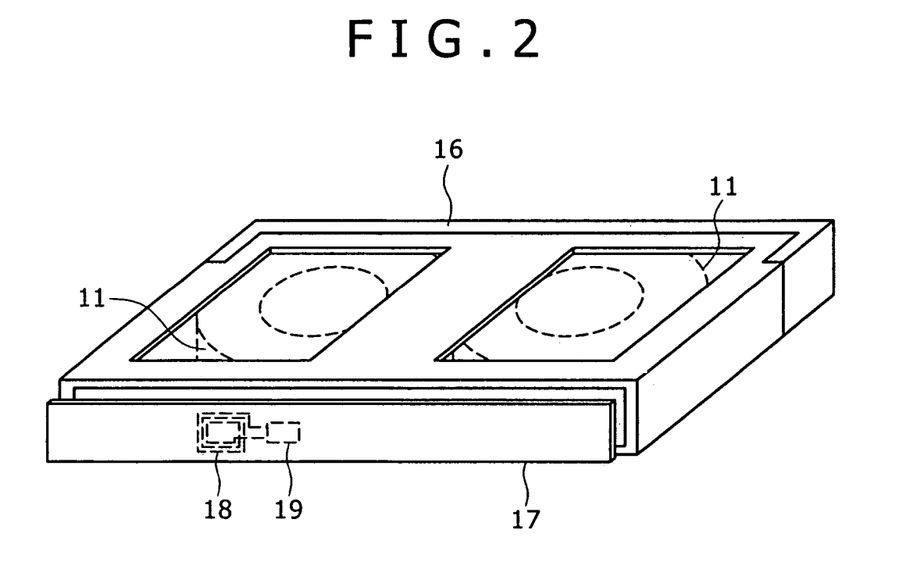
FIG. 2 is an exploded perspective view illustrating tape cassette containing a magnet tape for use in the information reproducing apparatus shown in FIG. 1.

The information reproducing apparatus practiced as the first embodiment of the invention shown in FIG. 1 constitutes an audio/video information reproducing apparatus 10 for reproducing information recorded to a recording area of a magnetic tape 11 that is an information recording medium. The audio/video information reproducing apparatus 10 has information reproducing means 12 capable of reproducing information such as main information that is audio/video information and data information from a recording area of the magnetic tape 11 loaded on the audio/video information reproducing apparatus 10 and a data information read means 21 capable of reading, in a non-contact manner, data information from a memory 20 incorporated in a memory incorporating integrated circuit (hereafter referred to as a memory IC) 19 fixed to a tape cassette 16 that is a case incorporating the magnetic tape 11, the memory IC 19 having an antenna 18 attached on the rear side of a label 17 attached to the tape cassette 16, the data information read means 21 being arranged as corresponding to the memory IC 19 as shown in FIG. 2.

The antenna 18 and the memory IC 19 attached to the rear side of the label 17 sealed on the rear side of the label 17, the antenna 18 and the memory IC 19 covered with a thin film of thermosetting resin. The rear side of the label 17 on which the antenna 18 and the memory IC 19 are arranged is attached to the tape cassette 16 with a pressure-sensitive adhesive. The thermosetting resin for sealing the antenna 18 and the memory IC 19 is very soft at room temperatures, so that, if the label 17 is detached from the tape cassette 16, the antenna 18 and the memory IC 19 are destroyed accordingly. This prevents the memory IC 19 fixed to the tape cassette 16 from being detached from the tape cassette 16 and then attached to another tape cassette for illegal use.

The memory 20 incorporated in the memory IC 19 stores unique identification data information (hereafter referred to as ID data information) as preset information at the manufacture of the memory IC 19. This ID data information is a combination of a manufacture lot number, a manufacture date, and serial number of the memory IC 19, for example.

An information reproducing means 12 includes a magnetic head block 13 for reading main information and other information from a recording area of the magnetic tape 11 by moving relative to the running magnetic tape 11 along the length thereof in a non-contact manner, a tape head drive block 14 for driving the magnetic tape 11 and the magnetic head block 13, and an information reproduction processing block 15 for controlling the operation of the tape head drive 14 and executes the processing of reproducing the main information and other information read from a recording area of the magnetic tape 11 by the magnetic head block 13. The tape head drive 14 includes a rotary mechanism block configured by a motor and gears for example.

The data information read means 21 has an antenna block 22 for capturing, via the antenna 18 linked to the memory IC 19, data information from the memory 20 of the memory IC 19 fixed to the tape cassette 16 arranged on the rear of the label 17 and a reception processing block 23 for receiving and reproducing the data information captured through the antenna block 22. The antenna block 22 and the reception processing block 23 also supply power to the memory IC 19 via the antenna 18 in a dielectric manner. The memory IC 19 operates on the received power dielectrically supplied via the antenna 18. The data information read from the memory 20 of the memory IC 19 is reproduced and obtained in the reception processing block 23.

Further, the audio/video information reproducing apparatus 10 shown in FIG. 1 has an information storage memory means 25 in which at least unique individual key data information is stored and a system controller 30 to which the information reproducing means 12, the data information read means 21, and the information storage memory means 25 are connected for example, the system controller 30 forming operation control means for controlling the operations of the connected means. The information storage memory means 25, formed by a semiconductor memory for example, stores data information under the control of the system controller 30.

The information storage memory means 25 stores not only the individual key data information unique to the audio/video information reproducing apparatus 10 but also the individual key data information unique to another audio/video information reproducing apparatus, thereby storing mutually different pieces of individual key data information. The information storage memory means 25 also stores master key data information, AP flag data information, and AP mode flag data information for example to be described later.

The system controller 30 selectively sets an information reproduction restriction status for imposing restriction on the reproduction of main information that is audio/video signal information for example read from a recording area of the magnetic tape 11 by the information reproducing means 12 as operation control over the information reproducing means 12. The above-mentioned AP flag data information is selectively indicative of "valid" or "invalid"; "valid" indicates that information reproduction is executed when the information reproduction restriction status is set and "invalid" indicates otherwise. The above-mentioned AP mode flag data information is selectively indicative of "ON" or "OFF"; "ON" indicates that the information reproduction restriction status is set and "OFF" indicates otherwise.

The system controller 30 is connected with an input operation block 31 through which control data for example necessary for the operation of the system controller 30, a ROM 32 in which various programs for example are stored, a RAM 33 in which various data for example in the course of processing are stored, and a display block 34. The display block 34 displays menus for the selection of data to be entered in the system controller 30 and to be processed in the system controller 30, the operation control statuses by the system controller 30, and the statuses of the information reproducing means 12, data information read means 21, and the information storage memory means 25 for example.

The following describes an example in which, in the above-mentioned configuration, the information storage memory means 25 of the audio/video information reproducing apparatus 10 stores plural pieces of individual key data information including individual key data information unique to the audio/video information reproducing apparatus 10, master key data information, AP flag data information, and AP mode flag data information, the memory 20 incorporated in the memory IC 19 fixed to the tape cassette 16 stores ID information, identification key data information having the same contents as one of pieces of individual key data to be stored in the information storage memory means 25, and AP mode flag data information for example, and a recording area of the magnetic tape 11 records the main information that is audio/video signal information, the same ID data information as the ID data information stored in the memory 20 in the memory IC 19, the master key data information, and the AP flag data information for example, the magnetic tape 11 being loaded on the audio/video information reproducing apparatus 10 as an information recording medium for information reproduction, as shown in FIG. 1.

Figure 3:
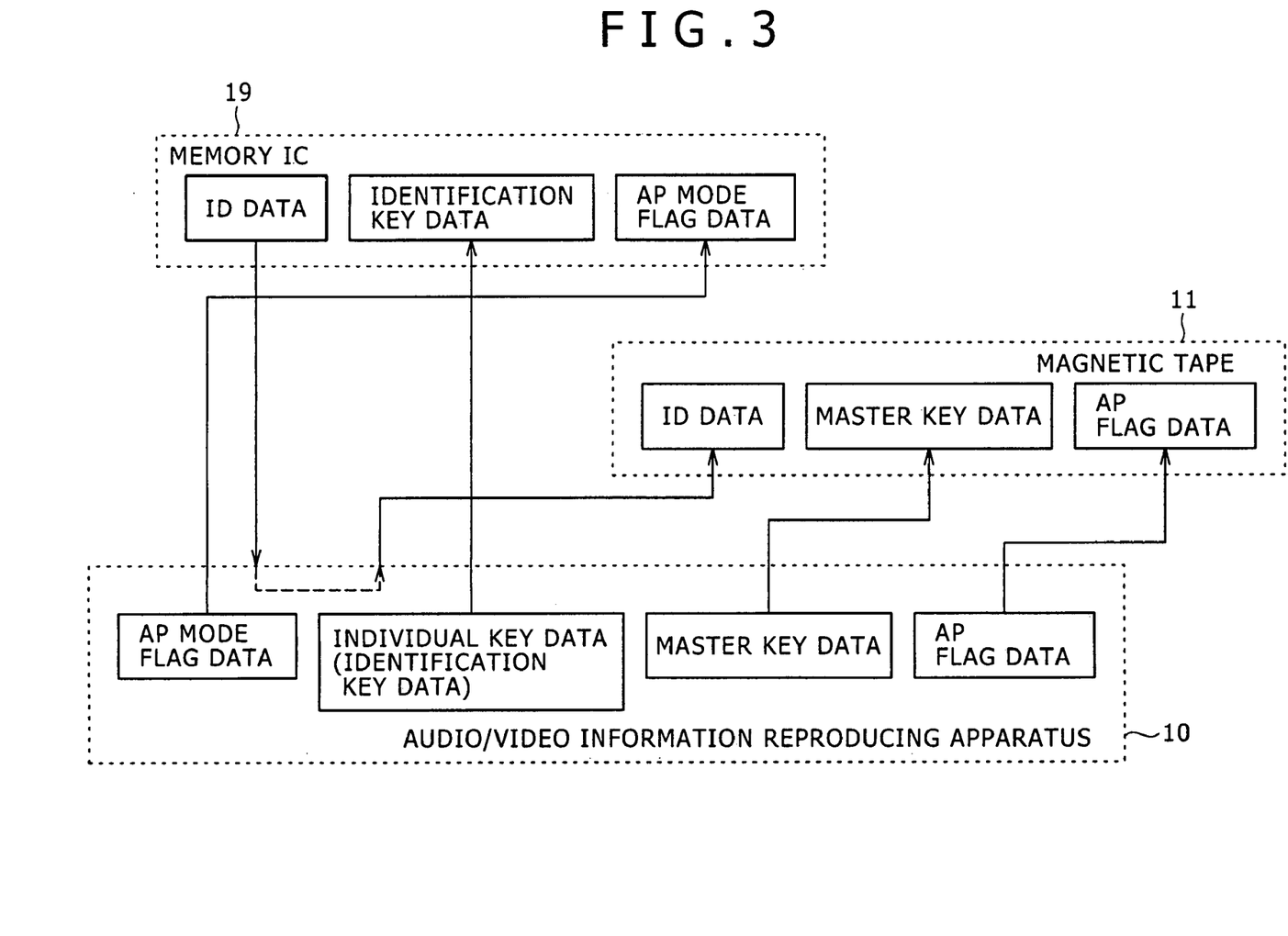
FIG. 3 is a schematic diagram illustrating a storage status of data information associated with the information reproducing apparatus shown in FIG. 1.

At this moment, the data information of the audio/video information reproducing apparatus 10 as stored in the information storage memory means 25, the data information of the memory IC 19 as stored in the memory 20, and the data information of the magnetic tape 11 as recorded in a recording area thereof are organized as shown in FIG. 3. To be more specific, the audio/video information reproducing apparatus 10 has AP mode flag data information, plural pieces of individual key data information, master key data information, and AP flag data information, the memory IC 19 has ID data information, key data information for information identification, and AP mode flag data information, and the magnetic tape 11 has ID data information, master key data information, and AP flag data information.

As indicated with arrows in FIG. 3, the key data information for information identification and the AP mode flag data information stored in the memory IC 19 are obtained by duplicatingly writing those stored in the information storage memory means 25 of the audio/video information reproducing apparatus 10 to the memory 20 of the memory IC 19, for example. The ID data information recorded to the magnetic tape 11 is obtained by duplicatingly recording that stored in the memory 20 of the memory IC 19 to a recording area of the magnetic tape 11 via the audio/video information reproducing apparatus 10. The master key data information and the AP flag data information recorded to the magnetic tape 11 are obtained by duplicatingly recording those stored in the information storage memory means 25 of the audio/video information reproducing apparatus 10 to a recording area of the magnetic tape 11.

In the above-mentioned configuration, when the magnetic tape 11 incorporated in the tape cassette 16 is loaded on the audio/video information reproducing apparatus 10, the system controller 30 first checks if the memory IC 19 is fixed to the tape cassette 16 and the data information read from the memory 20 incorporated in the memory IC 19 is discriminable on the basis of an output signal from the reception processing block 23 in the data information read means 21. Next, the ID data information included in the data information read from the memory 20 by the data information read means 21 is compared with the ID data information reproduced from a recording area of the magnetic tape 11 by the information reproducing means 12 obtained from the information reproduction processing block 15 in the information reproducing means 12 to check if a match is found between the contents of both the data information.

At this stage, it is possible that the memory IC 19 is found not fixed to the tape cassette 16, the data information read from the memory 20 is found indiscriminable, or the ID data information read from the 20 is found mismatching with the ID data information reproduced from a recording area of the magnetic tape 11. If this happens and the AP flag data information reproduced from the recording area of the magnetic tape 11 by the information reproducing means 12 obtained from the information reproduction processing block 15 in the information reproducing means 12 is indicative of "invalid", then the system controller 30 causes the information reproducing means 12 to reproduce the main information that is audio/video information for example recorded to the recording area of the magnetic tape 11. If the AP flag data information reproduced from the recording area of the magnetic tape 11 by the information reproducing means 12 is indicative of "valid", then the system controller 30 sets the information reproduction restriction status and compares the master key data information reproduced from the recording area of the magnetic tape 11 by the information reproducing means 12 obtained from the information reproduction processing block 15 in the information reproducing means 12 with the master key data information stored in the information storage memory means 25. If a match is found, the system controller 30 causes the information reproducing means 12 to reproduce the main information recorded to the recording area of the magnetic tape 11. If a mismatch is found, the system controller 30 does not cause the information reproducing means 12 to reproduce the main information recorded to the recording area of the magnetic tape 11.

On the other hand, if the memory IC 19 is found fixed to the tape cassette 16, the data information read from the memory 20 is found discriminable, and the ID data information read from the memory 20 is found matching with the ID data information reproduced from the recording area of the magnetic tape 11, then the system controller 30 causes the information reproducing means 12 to reproduce the main information that is audio/video signal information for example from the recording area of the magnetic tape 11 when the AP mode flag data information included in the data information read from the memory 20 by the data information read means 21 is indicative of "OFF". If the AP mode flag data information included in the data information read from the memory 20 by the data information read means 21 is indicative of "ON", then the system controller 30 compares the identification key data information included in the data information read from the memory 20 by the data information read means 21 with plural pieces of individual key data information stored in the information storage memory means 25. If the identification key data information is found matching in contents with any one of the plural pieces of individual key data information, then the system controller 30 causes the information reproducing means 12 to reproduce the main information that is audio/video signal information for example from the recording area of the magnetic tape 11. If the identification key data information is found mismatching in contents with any one of the plural pieces of individual key data information, then the system controller 30 does not cause the information reproducing means 12 to reproduce the main information from the recording area of the magnetic tape 11.

Consequently, if, with the magnetic tape 11 loaded on the audio/video information reproducing apparatus 10, the reproduction of the main information from the recording area thereof is restricted, and only when the audio/video information reproducing apparatus 10 in which the identification key data information stored in the memory 20 of the memory IC 19 fixed to the tape cassette 16 matches in contents with any one of plural pieces of individual key data information stored in the information storage memory means 25 in the audio/video information reproducing apparatus 10 or the master key data information recorded to the recording area of the magnetic tape 11 matches in contents with the master key data information stored on the information storage memory means 25 in the audio/video information reproducing apparatus 10 corresponds to a preset particular information reproducing apparatus, the main information may be correctly reproduced from that recording area.

Therefore, the audio/video information reproducing apparatus 10 may constitute an information reproduction system that circumvents the above-mentioned problems associated with the illegal copies of digital information recording media and like problems associated with various kinds of information recording media.

Figure 4:
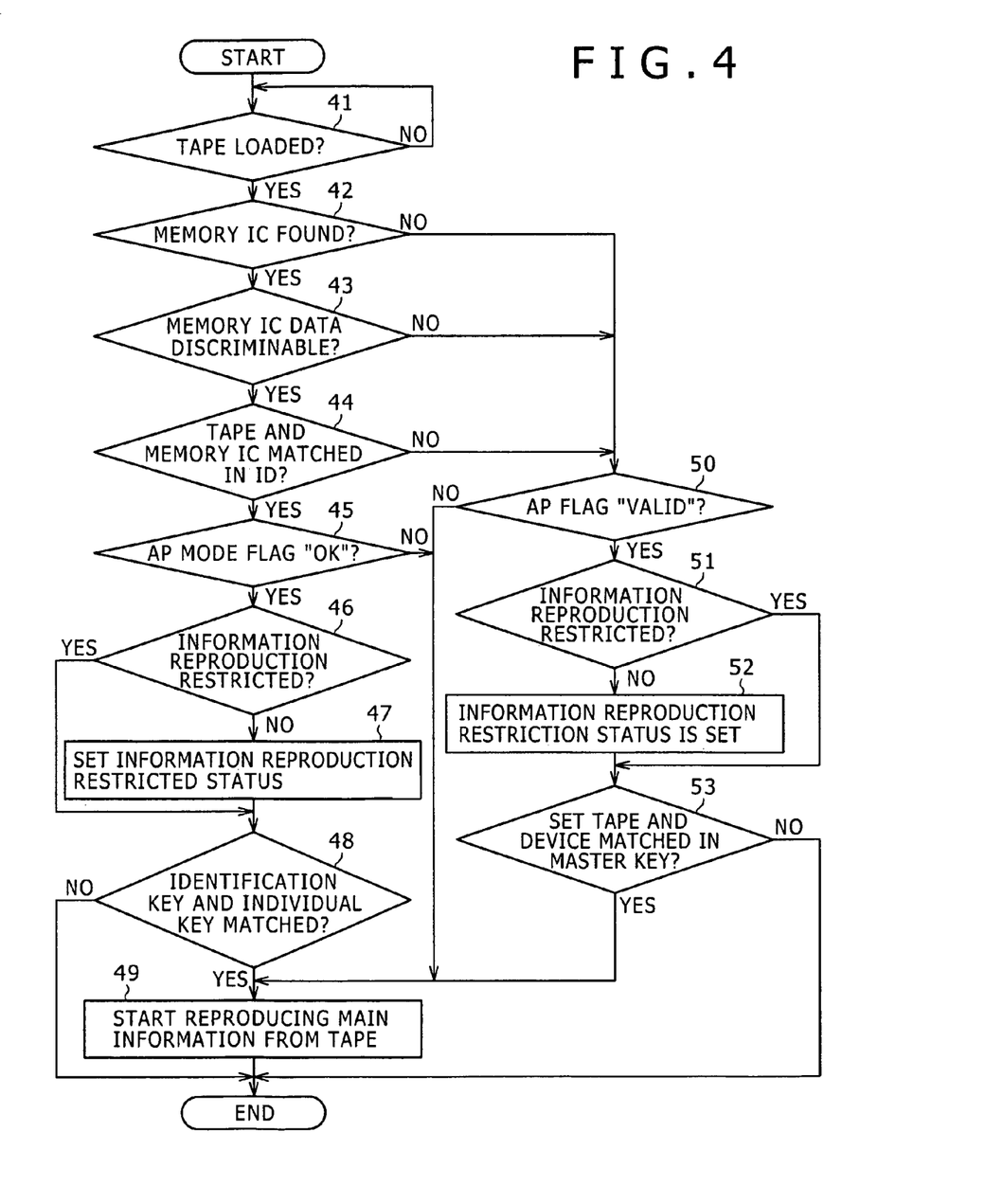
FIG. 4 is a flowchart indicative of a control program that is executed by a system controller forming operation control means in the information reproducing apparatus shown in FIG. 1.

Now, referring to FIG. 4, there is shown a flowchart indicative of an exemplary control program that is executed for operation control with the magnetic tape 11 in the tape cassette 16 loaded on the audio/video information reproducing apparatus 10 as described above.

In the flowchart shown in FIG. 4, after starting, in step S41, a decision is made whether or not the magnetic tape 11 incorporated in the tape cassette 16 is loaded on the audio/video information reproducing apparatus 10 on the basis of information given from the information reproducing means 12. If the magnetic tape 11 is found not loaded, then the decision of step S41 is repeated. If the magnetic tape 11 is found loaded, then a decision is made in step S42 whether or not the memory IC 19 is fixed to the tape cassette 16 on the basis of an output signal given from the reception processing block 23 in the data information read means 21.

If the memory IC 19 is found fixed to the tape cassette 16, then a decision is made in step S43 whether or not the data information read from the memory 20 incorporated in the memory IC 19 is discriminable. If the data information read from the memory 20 is found discriminable, then a decision is made in step S44 whether or not the ID data information included in the data information read from the memory 20 by the data information read means 21 matches in contents with the ID data information reproduced from a recording area of the magnetic tape 11 by the information reproducing means 12 obtained from the information reproduction processing block 15 in the information reproducing means 12. If a match is found, the procedure goes to step S45.

In step S45, a decision is made whether or not the AP mode flag data information included in the data information read from the memory 20 by the data information read means 21 is "ON". If the AP mode flag data information is found "ON", then a decision is made in step S46 whether or not the information reproduction restriction status is set. If this status is found not set, then the status is set in step S47, upon which the procedure goes to step S48. If the status is found set, then the procedure goes from step S46 directly to step S48.

In step S48, a decision is made whether or not the identification key data information included in the data information read from the memory 20 by the data information read means 21 matches in content with plural pieces of individual key data information stored in the information storage memory means 25. If match is found, then the information reproducing means 12 starts reproducing the main information from a recording area of the magnetic tape 11, thereby ending the program in step S49. If a mismatch is found, the information reproducing means 12 ends the program without starting the reproduction of the main information from a recording area of the magnetic tape 11.

On the other hand, if the AP mode flag data information is found not "ON" in step S45, namely found "OFF", then the procedure goes from step S45 directly to step S49. In step S49, the information reproducing means 12 starts reproducing the main information recorded to a recording area of the magnetic tape 11, thereby ending the program.

If the memory IC 19 is found not fixed to the tape cassette 16 in step S42, if the data information read from the memory 20 is found indiscriminable in step S43, or if the ID data information included in the data information read from the memory 20 by the data information read means 21 is found mismatching in contents with the ID data information reproduced from the recording area of the magnetic tape 11 by the information reproducing means 12 in step S44, the procedure goes to step S50.

In step S50, a decision is made whether or not the AP flag data information reproduced from a recording area of the magnetic tape 11 by the information reproducing means 12 obtained from the information reproduction processing block 15 in the information reproducing means 12 is found "valid". If the AP flag data information is found not "valid", namely "invalid", then the procedure goes from step S50 directly to step S49. In step S49, the information reproducing means 12 starts reproducing the main information from a recording area of the magnetic tape 11, thereby ending the program.

On the other hand, if the AP flag data information is found "valid" in step S50, then a decision is made in step S51 whether or not the information reproduction restriction status is set. If this status is found not set, then the status is set in step S52, upon which the procedure goes to step S53. If the status is found set, then the procedure goes from step S51 directly to step S53.

In step S53, a decision is made whether or not the master key data information reproduced from a recording area of the magnetic tape 11 by the information reproducing means 12 matches in contents with the master key data information stored in the information storage memory means 25. If a match is found, then the procedure goes to step S49, in which the information reproducing means 12 starts reproducing the main information from a recording area of the magnetic tape 11, thereby ending the program. If a mismatch is found, then the program is ended without causing the information reproducing means 12 to start reproducing the main information from a recording area of the magnetic tape 11.

Embodiment 2

Figure 5:
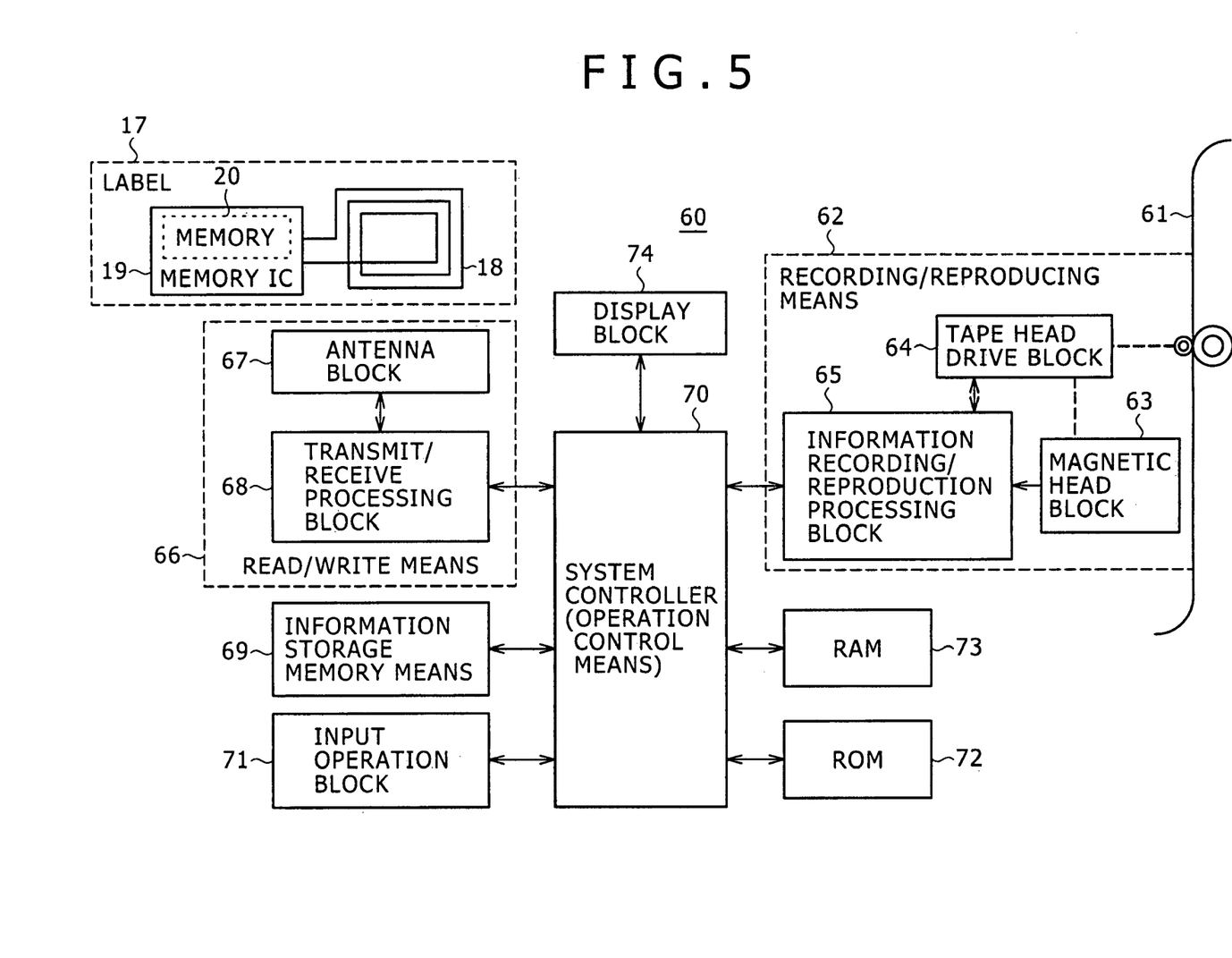
FIG. 5 is a block diagram illustrating an exemplary configuration of an information recording/reproducing apparatus practiced as another embodiment of the invention along with an information recording medium loaded thereon and an exemplary label associated therewith.

Now, referring to FIG. 5, there is shown an exemplary configuration of an information recording/reproducing apparatus practiced as a second embodiment of the invention along with an information recording medium loaded thereon and an exemplary label associated therewith.

An information recording/reproducing apparatus practiced as a second embodiment of the invention constitutes an audio/video information reproducing apparatus 60 capable recording information to a recording area of a magnetic tape 61 that is an information recording medium and reproducing information from a recording area of the magnetic tape 61. This audio/video recording/reproducing apparatus 60 has both recording/reproducing means 62 and read/write means 66.

The recording/reproducing means 62 is capable of recording main information that is audio/video signal information and other data information for example to a recording area of the magnetic tape 61 loaded on the audio/video recording/reproducing apparatus 60 and reproducing main information that is audio/video signal information and other data information for example from a recording area of the magnetic tape 61 loaded on this apparatus. The read/write means 66 is arranged along with an antenna 18 on the rear side of a same label 17 as shown in FIG. 2 to be attached to a tape cassette incorporating the magnetic tape 61 configured in the same manner as the tape cassette 16 shown in FIG. 2, provided as corresponding to a memory IC 19 fixed to the tape cassette with the rear side of the label 17 adhesively attached to the tape cassette, stores data information in the memory 20 of the memory IC 19 in a non-contact manner, and reads data information from the memory 20 of the memory IC 19.

The antenna 18 and the memory IC 19 arranged on the rear side of the label 17 and the memory 20 incorporated in the memory IC 19 are generally the same as the antenna 18, the memory IC 19, and the memory 20 shown in FIGS. 1 and 2. Therefore, detail description of these components will be skipped for brevity.

The recording/reproducing means 62 has a magnetic head block 63 that takes a status in which the magnetic head block 63 moves relative to the magnetic tape 61 running along the length thereof to record main information and other information to a recording area of the magnetic tape 61 or a status in which the magnetic head block 63 reads main information and other information from a recording area of the magnetic tape 61, a tape head drive block 64 for driving the magnetic tape 61 and the magnetic head block 63, and an information recording/reproduction processing block 65 for executing recording processing on main information and other information to be recorded to a recording area of the magnetic tape 61 by the magnetic head block 63 and reproduction processing on main information and other information read from a recording area of the magnetic tape 61. The tape head drive block 64 includes a rotary mechanism block based on a motor and gears for example.

The read/write means 66 includes an antenna block 67 that takes a status in which data information is transmitted to the memory 20 incorporated in the memory IC 19 fixed to the tape cassette arranged on the rear side of the label 17 via the antenna 18 connected to the memory IC or a status in which data information is captured from the memory 20 of the memory IC 19 via the antenna 18 and a transmission/reception block 68 that executes transmission and supply processing on data information to be transmitted from the antenna block 67 to the memory IC 19 via the antenna 18 and reception and reproduction processing on the data information captured by the antenna block 67. The antenna block 67 and the transmission/reception block 68 also inductively supply power to the memory IC 19 via the antenna 18. The memory IC 19 operates on the power inductively supplied via the antenna 18. In the transmission/reception block 68, the data information read from the memory 20 incorporated in the memory IC 19 is reproduced.

Further, the audio/video recording/reproducing apparatus 60 shown in FIG. 5 has information storage memory means 69 for storing at least individual key data information unique to the audio/video recording/reproducing apparatus 60, recording/reproducing means 62, and a system controller 70 forming operation control means that is connected to the recording/reproducing means 62, the read/write means 66, and the information storage memory means 69 to execute operation control on these connected components. The information storage memory means 69 is formed by a semiconductor memory device for example on which data information is read or written under the control of the system controller 70.

The information storage memory means 69 stores not only the individual key data information unique to the audio/video recording/reproducing apparatus 60, but also the individual key data information unique to other audio/video information recording/reproducing apparatuses, thereby storing mutually different pieces of individual key data information. In addition, the information storage memory means 69 stores the same master key data information, AP flag data information indicative of "valid" or "invalid", and AP mode flag data information indicative of "ON" or "OFF" as stored in the information storage memory means 25 in the audio/video information reproducing apparatus 10 shown in FIG. 1.

The system controller 70 is connected with an input operation block 71 through which control data for example necessary for the operation of the system controller 70, a ROM 72 in which various programs for example are stored, a RAM 73 in which various data for example in the course of processing are stored, and a display block 74. The display block 74 displays menus for the selection of data to be entered in the system controller 70 and to be processed in the system controller 70, the operation control statuses by the system controller 70, and the statuses of the information reproducing means 62, the read/write means 66, and the information storage memory means 69 for example.

Figure 6:
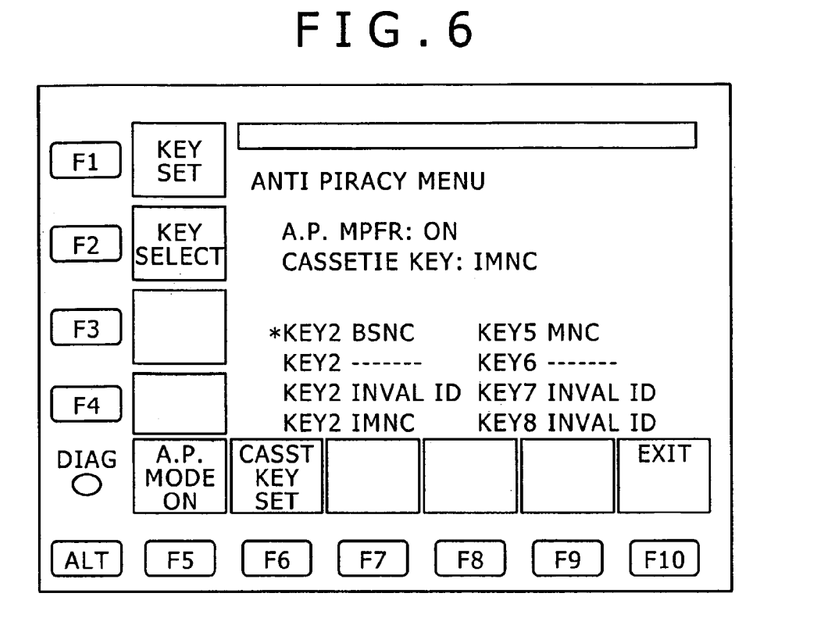
FIG. 6 is a schematic diagram illustrating operations of the information recording/reproducing apparatus shown in FIG. 5.

For example, the storing of plural pieces of key data information into the information storage memory means 69 is executed through display of a data input screen image on the display block 74 as shown in FIG. 6. In the data input screen image shown in FIG. 6, eight pieces of individual key data information KEY1 through KEY8 may be stored in the information storage memory means 69 by entering the corresponding key codes, KEY2 and KEY6 being not stored. Of these keys, KEY1 attached with asterisk (*) is indicative of the individual key data information unique to the audio/video recording/reproducing apparatus 60, having a key name of "BSNC".

Figure 7:
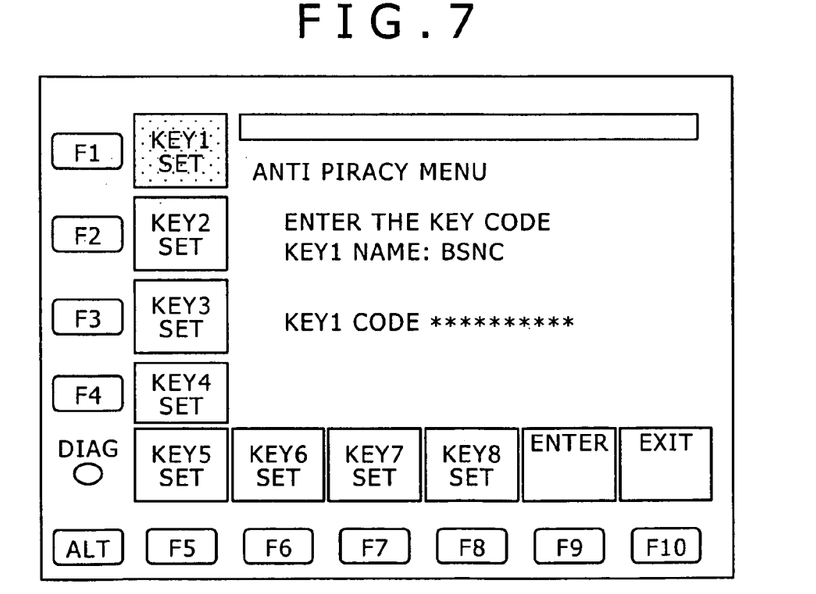
FIG. 7 is another schematic diagram illustrating operations of the information recording/reproducing apparatus shown in FIG. 5.

Modification of the individual key data information once stored in the information storage memory means 69 is executed when a data input screen image shown in FIG. 7 is shown on the display block 74. In the data input screen image shown in FIG. 7, KEY1 is subject to modification among plural pieces of individual key data information. Modification may be made by entering a new key code into a position indicated by asterisks.

Figure 8:
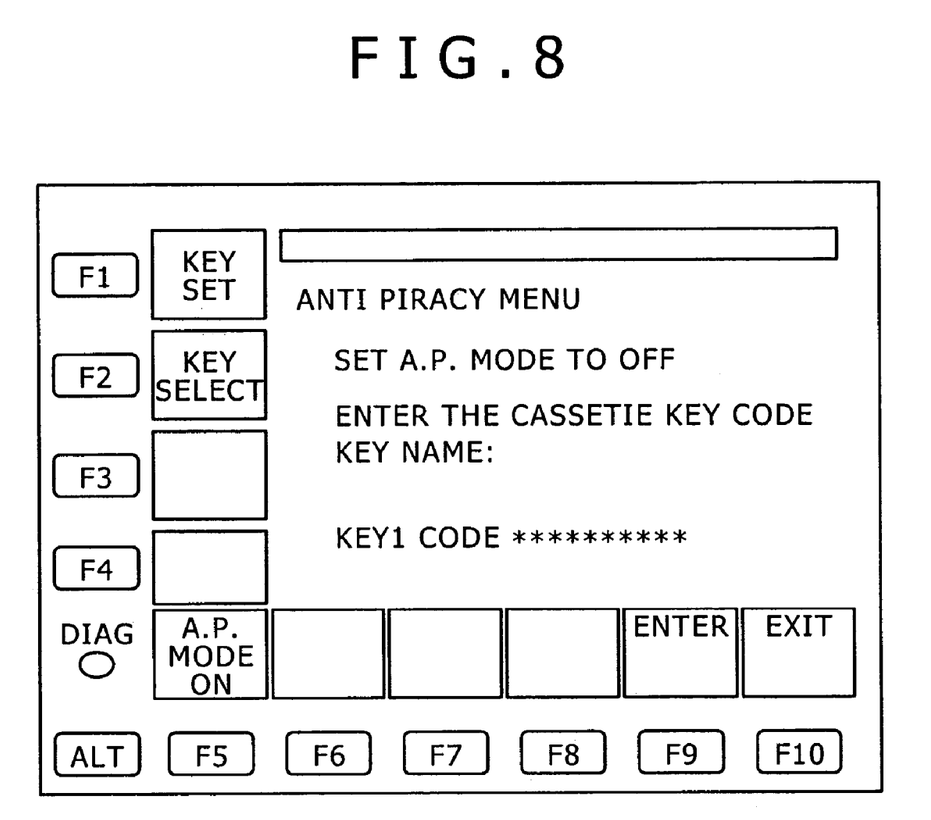
FIG. 8 is still another schematic diagram illustrating operations of the information recording/reproducing apparatus shown in FIG. 5.

In addition, the setting in which AP flag data information is indicative of "valid" or "invalid" and AP mode flag data information is indicative of "ON" or "OFF" is executed when a data input screen image as shown in FIG. 8 is displayed on the display block 74, for example. In the data input screen image shown in FIG. 8, a key code indicative of the individual key data information to be stored as identification key data information into the memory 20 of the memory IC 19 fixed to the tape cassette is entered in a position indicated by asterisks for setting.

As described above, the magnetic tape 61 incorporated in the tape cassette is loaded on the audio/video recording/reproducing apparatus 60 in which the plural pieces of individual key data information unique to the audio/video recording/reproducing apparatus 60, the master key data information, the AP flag data information, and the AP mode flag data information are stored in the information storage memory means 69. Under this condition, the system controller 70 executes the following operations in response to input operations executed through an input operation block 71 in a status shown in FIG. 5.

First, of the plural pieces of individual key data information stored in the information storage memory means 69, the individual key data information unique to the audio/video recording/reproducing apparatus 60 is read. Identification key data information is formed on the basis of the read unique individual key data information. The AP mode flag data information stored in the information storage memory means 69 is read. The read/write means 66 stores the identification key data information and the AP mode flag data information into the memory 20 incorporated in the memory IC 19 of the tape cassette incorporating the magnetic tape 61 via the antenna 18. The identification key data information is substantially the same in contents as the unique individual key data information.

The read/write means 66 also reads the ID data information from the memory 20 of the memory IC 19 fixed to the tape cassette incorporating the magnetic tape 61 via the antenna 18 to capture the read ID data information. The recording/reproducing means 62 records the captured ID data information to a recording area of the magnetic tape 61. Consequently, the recording area of the magnetic tape 61 records the substantially the same ID data information as the ID data information stored in the memory 20.

Further, the master key data information and the AP flag data information are read from the information storage memory means 69. The recording/reproducing means 62 records the read master key data information and AP flag data information to a recording area of the magnetic tape 61. Consequently, the recording area of the magnetic tape 61 records substantially the same master key data information as the master key data information stored in the information storage memory means 69 and the AP flag data information.

As a result, a status is obtained in which the ID data information, the identification key data information having the same contents as any one of plural pieces of individual key data information stored in the information storage memory means 69, and the AP mode flag data information are stored in the memory 20 of the memory IC 19 fixed to the tape cassette incorporating the magnetic tape 61 and the main information that is audio/video signal information for example, the substantially the same ID data information as the ID data information stored in the memory 20 of the memory IC 19, and the AP flag data information are recorded to a recording area of the magnetic tape 61.

The system controller 70 executes a control operation for reproducing the main information recorded to a recording area of the magnetic tape 61 when, with plural pieces of individual key data information including individual key data information unique to the audio/video recording/reproducing apparatus 60, AP flag data information, and AP mode flag data information stored in the information storage memory means 69, a status is entered in which the magnetic tape 61 incorporated in the tape cassette is loaded on the audio/video recording/reproducing apparatus 60 as an information recording medium for information reproduction with the main information that is audio/video signal information for example, the same ID data information as the ID data information stored in the memory 20 of the memory IC 19, the master key data information, and the AP flag data information recorded to a recording area of the magnetic tape 61 with the ID data information, the identification key data information having the same contents as any one of plural pieces of individual key data information stored in the information storage memory means 25, and the AP mode flag data information stored in the memory 20 of the memory IC 19 fixed to the tape cassette.

In executing a control operation for reproducing main information from a recording area of the magnetic tape 61 loaded on the audio/video recording/reproducing apparatus 60 as an information recording medium for information reproduction, the system controller 70 first checks whether or not the memory IC 19 is fixed to the tape cassette incorporating the magnetic tape 61 and the data information read from the memory 20 of the memory IC 19 is discriminable on the basis of an output signal from the transmission/reception block 68 of the read/write means 66. Next, the system controller 70 compares the ID data information included in the data information read from the memory 20 by the read/write means 66 with the ID data information reproduced from a recording area of the magnetic tape 61 by the recording/reproducing means 62 obtained from the information recording/reproduction processing block 65 of the recording/reproducing means 62.

At this stage, it is possible that the memory IC 19 is found not fixed to the tape cassette, the data information read from the memory 20 is found indiscriminable, or the ID data information read from the 20 is found mismatching with the ID data information reproduced from a recording area of the magnetic tape 61. If this happens and the AP flag data information reproduced from the recording area of the magnetic tape 61 by the recording/reproducing means 62 obtained from the information reproduction processing block 65 in the information reproducing means 62 is indicative of "invalid", then the system controller 70 causes the information reproducing means 62 to reproduce the main information that is audio/video information for example recorded to the recording area of the magnetic tape 61. If the AP flag data information reproduced from the recording area of the magnetic tape 61 by the information reproducing means 62 is indicative of "valid", then the system controller 70 sets the information reproduction restriction status and compares the master key data information reproduced from the recording area of the magnetic tape 61 by the information reproducing means 62 obtained from the information reproduction processing block 65 in the information reproducing means 62 with the master key data information stored in the information storage memory means 69. If a match is found, the system controller 70 causes the information reproducing means 62 to reproduce the main information recorded to the recording area of the magnetic tape 61. If a mismatch is found, the system controller 70 does not cause the information reproducing means 62 to reproduce the main information recorded to the recording area of the magnetic tape 61.

On the other hand, if the memory IC 19 is found fixed to the tape cassette, the data information read from the memory 20 is found discriminable, and the ID data information read from the memory 20 is found matching with the ID data information reproduced from the recording area of the magnetic tape 61, then the system controller 70 causes the information reproducing means 62 to reproduce the main information that is audio/video signal information for example from the recording area of the magnetic tape 61 when the AP mode flag data information included in the data information read from the memory 20 by the read/write means 66 is indicative of "OFF". If the AP mode flag data information included in the data information read from the memory 20 by the read/write means 66 is indicative of "ON", then the system controller 70 sets the information reproduction restriction status and compares the identification key data information included in the data information read from the memory 20 by the read/write means 66 with plural pieces of individual key data information stored in the information storage memory means 69. If the identification key data information is found matching in contents with any one of the plural pieces of individual key data information, then the system controller 30 causes the information recording/reproducing means 62 to reproduce the main information from the recording area of the magnetic tape 61. If the identification key data information is found mismatching in contents with any one of the plural pieces of individual key data information, then the system controller 30 does not cause the recording/reproducing means 62 to reproduce the main information from the recording area of the magnetic tape 61.

Consequently, if, with the magnetic tape 61 loaded on the audio/video information reproducing apparatus 60, the reproduction of the main information from the recording area thereof is restricted, and only when the audio/video information reproducing apparatus 60 in which the identification key data information stored in the memory 20 of the memory IC 19 fixed to the tape cassette incorporating the magnetic tape 61 matches in contents with any one of plural pieces of individual key data information stored in the information storage memory means 69 in the audio/video information reproducing apparatus 60 or the master key data information recorded to the recording area of the magnetic tape 61 matches in contents with the master key data information stored on the information storage memory means 69 in the audio/video information reproducing apparatus 60 corresponds to a preset particular information reproducing apparatus, the main information may be correctly reproduced from that recording area.

Therefore, the audio/video information reproducing apparatus 60 may constitute an information reproduction system that circumvents the above-mentioned problems associated with the illegal copies of digital information recording media and like problems associated with various kinds of information recording media.

The control program to be executed by the system controller 70 to execute a control operation with the magnetic tape 61 incorporated in a tape cassette loaded on the audio/video recording/reproducing apparatus 60 as described above is approximately the same as the control program to be executed by the system controller 30 in the audio/video information reproducing apparatus 10 shown in FIG. 1 to execute a control operation with the magnetic tape 11 incorporated in the tape cassette 16 loaded on the audio/video information reproducing apparatus 10 as shown in FIG. 4 for example.

Embodiment 3

In each of the above-mentioned embodiment 1 and embodiment 2, the magnetic tape 11 incorporated in the tape cassette 16 or the magnetic tape 61 incorporated in a tape cassette is used as an information recording medium and the antenna 18 and the memory IC 19 incorporating the memory 20 are fixed to the tape cassette 16 incorporating the magnetic tape 11 or a tape cassette incorporating the magnetic tape 61. Alternatively, with each of the information reproducing apparatus and the information recording/reproducing apparatus practiced as embodiments of the invention, the magnetic tape 11 or the magnetic tape 61 may be replaced by a disc-shaped information recording medium for example and the antenna 18 and the memory IC 19 incorporating the memory 20 may be directly fixed to the disc-shaped information recording medium.

The data information read means 21 in embodiment 1 or the read/write means 66 in embodiment 2 reads data information from the memory 20 incorporated in the memory IC 19 in a non-contact manner relative to the memory IC 19. Alternatively, each of the data information read means 21 and the read/write means 66 may read data information from the memory 20 incorporated in the memory IC 19 in contact with or in connected to the memory IC 19.

As described and according to the invention, the information reproducing apparatus and the information recording/reproducing apparatus practiced as embodiments of the invention may constitute an information reproduction system that circumvents the above-mentioned problems associated with the illegal copies of digital information recording media and like problems associated with various kinds of information recording media, thereby providing wide applications in various fields.

While preferred embodiments of the present invention have been described using specific terms, such description is for illustrative purpose only, and it is to be understood that changes and variations may be made without departing from the spirit or scope of the following claims.

What is claimed is:

1. An information reproducing apparatus comprising:
    information reproduction means for reproducing information from a recording area of an information recording medium;
    data information read means for reading data information from an information recording medium or memory means fixed to a case incorporating said information recording medium;
    information storage memory means for storing unique individual key data information; and
    operation control means for selectively setting an information reproduction restriction status for imposing a restriction on reproduction of main information read from a recording area of an information recording medium by said information reproduction means;
    wherein, with said information recording medium for information reproduction loaded and said information reproduction restriction status set,
    said operation control means compares contents of identification key data information read from any one of said loaded information recording medium and said memory means fixed to said case incorporating said information recording medium obtained from said data information read means with contents of said individual key data information stored in said information storage memory means and, if a match is found,
    said information reproduction means reproduces said main information read from said recording area of said loaded information recording medium.

2. The information reproducing apparatus according to claim 1 wherein said information storage memory means also stores master key data information in addition to said unique individual key data information and, if, with said information recording medium loaded and said information reproduction restriction status set, said operation control means is incapable of getting data information read from any one of said information recording medium and said memory means fixed to said case incorporating said information recording medium by said data information read means, said information reproduction means reproduces main information from said recording area of said loaded information recording medium when contents of master key data information reproduced from said recording area of said loaded information recording medium match with contents of master key data information stored in said information storage memory means.

3. The information reproducing apparatus according to claim 2 wherein said operation control means enters an operation status in which said individual key data information and said master key data information are stored in said information storage memory means.

4. The information reproducing apparatus according to claim 2 wherein said data information read means reads data information from any one of said loaded information recording medium and said memory means fixed to said case incorporating said information recording medium in a non-contact manner relative to any one of said loaded information recording medium and said case incorporating said information recording medium.

5. The information reproducing apparatus according to claim 1 wherein said information storage memory means also stores master key data in addition to said unique individual key data information, said operation control means compares, with said information recording medium loaded and said information reproduction restriction status set, contents of unique identification data information read from any one of said loaded information recording medium and said memory means fixed to said case incorporating said information recording medium with contents of unique identification data information reproduced from said recording area of said loaded information recording medium obtained from said information reproduction means, and, if a mismatch is found, said information reproducing means reproduces main information read from said recording area of said loaded information recording medium when contents of master key data information reproduced from said recording area of said loaded information recording medium obtained from said information reproduction means matches with contents of master key data information stored in said information storage memory means.

6. The information reproducing apparatus according to claim 5 wherein said operation control means enters an operation status in which said individual key data information and said master key data information are stored in said information storage memory means.

7. The information reproducing apparatus according to claim 5 wherein said data information read means reads data information from any one of said loaded information recording medium and said memory means fixed to said case incorporating said information recording medium in a non-contact manner relative to any one of said loaded information recording medium and said case incorporating said information recording medium.

8. The information reproducing apparatus according to claim 1 wherein said data information read means reads data information from any one of said loaded information recording medium and said memory means fixed to said case incorporating said information recording medium in a non-contact manner relative to any one of said loaded information recording medium and said case incorporating said information recording medium.

9. An information recording/reproducing apparatus comprising:
  recording/reproducing means for recording information to a recording area of an information recording medium and reproducing information from a recording area of an information recording medium;
  read/write means for reading data information from any one of information recording medium and memory means fixed to a case incorporating said information recording medium and writing data information to any one of information recording medium and memory means fixed to a case incorporating said information recording medium;
  information storage memory means for storing unique individual key data information; and
  operation control means for setting
    an operation status in which said read/write means reads unique identification data information from any one of information recording medium and memory means fixed to a case incorporating said information recording medium and said recording/reproducing means records said unique identification data information read by said read/write means to a recording area of said information recording medium,
    an operation status in which said read/write means writes identification key data information having substantially the same contents as contents of individual key data information stored in said information storage memory means to any one of an information recording medium and memory means fixed to a case incorporating said information recording medium, and
    an information reproduction restriction status in which a restriction is imposed on reproduction of main information from a recording area of an information recording medium by said recording/reproducing means;
  wherein, with said information recording medium for information reproduction loaded and said information reproduction restriction status set,
  said operation control means compares contents of identification key data information read from any one of said loaded information recording medium and said memory means fixed to said case incorporating said information recording medium obtained from said read/write means with contents of said individual key data information stored in said information storage memory means and, if a match is found,
  said recording/reproducing means reproduces said main information read from said recording area of said loaded information recording medium.

10. The information recording/reproducing apparatus according to claim 9 wherein
  said information storage memory means also stores master key data information in addition to said unique individual key data information,
  said operation controls means also sets an operation status in which said recording/reproducing means records master key data information stored in said information storage memory means to a recording area of an information recording medium, and,
  with said information recording medium loaded and said information reproduction restriction status set, if data information is not obtained from any one of said loaded information recording medium and said memory means fixed to said case incorporating said information recording medium, said recording/reproducing means reproduces main information read from said recording area of said loaded information recording medium when there is a match between contents of master key data information reproduced from said recording area of said loaded information recording medium obtained from said recording reproduction means and contents of master key data information stored in said information storage memory means.

11. The information recording/reproducing apparatus according to claim 10 wherein said operation control means enters an operation status in which said individual key data information and said master key data information are stored in said information storage memory means.

12. The information recording/reproducing apparatus according to claim 10 wherein said read/write means reads data information from any one of said loaded information recording medium and said memory means fixed to said case incorporating said information recording medium in a non-contact manner relative to any one of said loaded information recording medium and said case incorporating said information recording medium.

13. The information recording/reproducing apparatus according to claim 9 wherein
  said information storage memory means also stores master key data information in addition to said unique individual key data information,
  said operation control means sets an operation status in which said operation control means causes said recording/reproducing means to record master key data information stored in said information storage memory means to a recording area of an information recording medium,
  with said information recording medium loaded and said information reproduction restriction status set, said operation controls means compares contents of unique identification data information read from any one of said loaded information recording medium and memory means fixed to a case incorporating said information recording medium obtained from said read/write means with contents of unique identification data information reproduced from said recording area of said loaded information recording medium, and, if a mismatch is found,
  if a match is found between the contents of said master key data information reproduced from said recording area of said loaded information recording medium obtained from said read/write means and the contents of said master key data information stored in said information storage memory means, said recording/reproducing means reproduces main information from a recording area of said loaded information recording medium.

14. The information recording/reproducing apparatus according to claim 13 wherein said operation control means enters an operation status in which said individual key data information and said master key data information are stored in said information storage memory means.

15. The information recording/reproducing apparatus according to claim 13 wherein said read/write means reads data information from any one of said loaded information recording medium and said memory means fixed to said case incorporating said information recording medium in a non-contact manner relative to any one of said loaded information recording medium and said case incorporating said information recording medium.

16. The information recording/reproducing apparatus according to claim 9 wherein said read/write means reads data information from any one of said loaded information recording medium and said memory means fixed to said case incorporating said information recording medium in a non-contact manner relative to any one of said loaded information recording medium and said case incorporating said information recording medium.

17. An information reproducing apparatus comprising:
   an information reproduction unit for reproducing information from a recording area of an information recording medium;
   a data information read unit for reading data information from an information recording medium or memory unit fixed to a case incorporating said information recording medium;
   an information storage memory unit for storing unique individual key data information; and
   an operation control unit for selectively setting an information reproduction restriction status for imposing a restriction on reproduction of main information read from a recording area of an information by said information reproduction unit;
   wherein, with said information recording medium for information reproduction loaded and said information reproduction restriction status set,
   said operation control unit compares contents of identification key data information read from any one of said loaded information recording medium and said memory unit fixed to said case incorporating said information recording medium obtained from said data information read means with contents of said individual key data information stored in said information storage memory unit and, if a match is found,
   said information reproduction unit reproduces said main information read from said recording area of said loaded information recording medium.

18. An information recording/reproducing apparatus comprising:
   a recording/reproducing unit for recording information to a recording area of an information recording medium and reproducing information from a recording area of an information recording medium;
   a read/write unit for reading data information from any one of information recording medium and a memory unit fixed to a case incorporating said information recording medium and writing data information to any one of the information recording medium and memory unit fixed to a case incorporating said information recording medium;
   an information storage memory unit for storing unique individual key data information; and
   an operation control unit for setting
      an operation status in which said read/write unit reads unique identification data information from any one of information recording medium and memory unit fixed to a case incorporating said information recording medium and said recording/reproducing unit records said unique identification data information read by said read/write unit to a recording area of said information recording medium,
      an operation status in which said read/write unit writes identification key data information having substantially the same contents as contents of individual key data information stored in said information storage memory unit to any one of an information recording medium and memory unit fixed to a case incorporating said information recording medium, and
      an information reproduction restriction status in which a restriction is imposed on reproduction of main information from a recording area of an information recording medium by said recording/reproducing unit;
   wherein, with said information recording medium for information reproduction loaded and said information reproduction restriction status set,
   said operation control unit compares contents of identification key data information read from any one of said loaded information recording medium and said memory unit fixed to said case incorporating said information recording medium obtained from said read/write unit with contents of said individual key data information stored in said information storage memory unit and, if a match is found,
   said recording/reproducing unit reproduces said main information read from said recording area of said loaded information recording medium.

* * * * *